United States Patent
Hirano

[11] Patent Number: 5,856,976
[45] Date of Patent: Jan. 5, 1999

[54] MULTIPLEX TRANSMISSION SYSTEM FOR USE IN VEHICLES

[75] Inventor: Seiji Hirano, Hiroshima, Japan

[73] Assignee: Mazda Motor Corporation, Hiroshima-ken, Japan

[21] Appl. No.: 226,871

[22] Filed: Apr. 12, 1994

Related U.S. Application Data

[63] Continuation of Ser. No. 676,353, Mar. 28, 1991, abandoned.

[30] Foreign Application Priority Data

Mar. 30, 1990 [JP] Japan ........................................ 2-81408

[51] Int. Cl.$^6$ ............................... H04L 12/66; H04J 3/02
[52] U.S. Cl. ............................................. 370/401; 370/445
[58] Field of Search .............................. 370/85.13, 85.14, 370/94.1, 94.3, 401, 445, 402

[56] References Cited

U.S. PATENT DOCUMENTS

| | | |
|---|---|---|
| 4,627,052 | 12/1986 | Hoare et al. . |
| 4,942,571 | 7/1990 | Moller et al. . |
| 4,951,281 | 8/1990 | Muto et al. . |
| 4,975,906 | 12/1990 | Takiyasu et al. . |
| 5,018,133 | 5/1991 | Tsukakoshi et al. . |
| 5,050,165 | 9/1991 | Yoshioka et al. . |
| 5,086,426 | 2/1992 | Tsukakoshi et al. . |

FOREIGN PATENT DOCUMENTS

| | | |
|---|---|---|
| 0 399 491 | 11/1990 | European Pat. Off. . |
| 3904403 | 8/1989 | Germany . |
| 41 10 372.6-31 | 2/1994 | Germany . |
| 64-36541 | 2/1964 | Japan . |
| 62-4658 | 1/1987 | Japan . |

OTHER PUBLICATIONS

Intel Corporation, *82526 Serial Communications Controller Architectural Overview*, Jan., 1989, all pages.

C391/035 "Advanced engineering measurement and information systems of future vehicle wiring systems—multiplex" by F. Heintz et al., *IMechE*, 1989.

SAE Technical Paper Series 830536, A.J. Bozzini and A. Goldberger, "Serial Bus Structures for Automotive Applications", International Congress & Exposition Detroit, Michigan, Feb. 28–Mar. 4, 1983.

German Search Report dated Mar. 18, 1994.

*Primary Examiner*—Temesghen Ghebretinsae

[57] ABSTRACT

In a multiplex transmission system for use in a vehicle, a plurality of networks are interconnected via a gateway. In each individual network, electrical accessories that are mutually interrelated in terms of control are connected to the same transmission line.

19 Claims, 7 Drawing Sheets

F I G. 4

| ID | NETWORK 10 | | | METER | COMBI-NATION 20 | | | FAULT 30 |
|---|---|---|---|---|---|---|---|---|
| | EGI | EAT | | | | | | |
| 80 | ○ | ○ | × | × | × | ○ | × | × |
| 81 | × | ○ | × | × | × | × | × | ○ |

MULTIPLEX TRANSMISSION SYSTEM FOR USE IN VEHICLES

This application is a continuation of application Ser. No. 07/676,353, filed Mar. 28, 1991, now abandoned.

BACKGROUND OF THE INVENTION

This invention relates to a multiplex transmission system for vehicles, in which multiplex transmission such as of the CSMA/CD type is applied to the transmission of signals in an automotive vehicle. More particularly, the invention relates to a signal transmission system in vehicles, which system is so adapted that a plurality of decentralized-type multiplex communication networks are formed and the networks are interconnected by gateway nodes.

The greater use of electronics in automotive vehicles has been accompanied by a number of serious problems, among which are the increased size and complexity of the wire harnesses that interconnect the electronic components. Multiplex communication has come to the fore as a means of solving these problems, particularly in the automobile field. Multiplex communication refers to transmission, by time-division multiplexing, of plural items of data on a single wire harness, and basically employs serial transmission.

In the field of automobiles, multiplex communication networks may be considered as being divided into either of two classes, one class being complete multiplex- and partial multiplex-type networks, and the other being centralized- and decentralized-type networks.

The partial multiplex-type network mixes a non-multiplex communication portion and a multiplex communication portion. In the multiplex communication portion, switches and loads decentralized in terms of distances are connected by a multiplex transmission unit. Since separate wiring is required between the multiplex transmission unit and the switches and loads, a drawback is that the numbers of wires is greater, although the overall length of the interconnecting wiring is reduced.

The centralized-type network is one in which a plurality of slave transmission units are connected to a single master transmission unit. With a network having this configuration, a smaller harness diameter is achieved but the entire system is rendered inoperative if the master transmission unit fails. Another shortcoming is that difficulties are encountered in design modification. On the other hand, the decentralized network, though higher in cost, exhibits a number of advantages, such as a much smaller harness diameter, high reliability with regard to partial failure and greater flexibility in terms of design modification. (For an example of the latter, see the specification of Japanese Patent Application Laid-Open No. 62-4658).

With regard to this decentralized multiplex communication system, a CSMA/CD system is employed in accordance with an SAE (Society of Automotive Engineers) standardization proposal.

The assignee of this invention has also proposed a PALM-NET (protocol for automotive local area network) system which is a further development upon this CSMA/CD system. For example, see the specification of Japanese Patent Application No. 62-302421.

Further, in the specification of Japanese Patent Application Laid-Open (KOKAI) No. 64-36541 belonging to the assignee of this invention, a master node transmits a reference pulse for time sharing the right to access a bus in order to set a channel on a transmission line.

In recent multiplex communication systems for vehicles, it has been proposed to connect vehicle controllers (an engine controller, traction controller, etc.) by multiplex communication. In these controllers, data to be transmitted to other controllers is generated quite frequently, and so is data necessary for these controllers themselves. Therefore, in a case where communication nodes for such high-speed controllers are mixed with nodes for low-speed electrical accessories, such as actuators (motors, etc.) and sensors, the communication speed of the overall system must be made high or faster. This increasing of the communication speed for the overall system is a cause of higher cost.

With the greater sophistication of traction control, rear-wheel steering control and ABS control, etc., not only is a higher processing speed necessary for such control, but the information data employed by these controllers is closely interrelated with the controllers. In other words, a highly frequent exchange of information among the controllers is essential. More specifically, the time has come to reconstruct the system by treating nodes for controllers having a high degree of interrelationship as being separate from other ordinary nodes, and considering them as one group.

When reconstructing the network, an important consideration is the degree to which the reconstruction will contribute to control of vehicle travel. For example, the fact that the nodes for controllers are closely interrelated should be taken into consideration.

SUMMARY OF THE INVENTION

An object of the present invention is to provide a multiplex transmission system for vehicles, in which a plurality of networks are formed by gathering together nodes in dependence upon the degree of contribution to control vehicle travel, thereby making possible a more concentrated assemblage of information communication paths for the above-mentioned control.

According to the present invention, the foregoing object is attained by providing a multiplex transmission system for a vehicle having one or more communication nodes belonging to a first group and one or more communication nodes belonging to a second group, the system comprising:

a first network comprising a first multiplex transmission line to which the communication nodes of the first group are commonly connected;

a second network comprising a second multiplex transmission line to which the communication nodes of the second group are commonly connected; and a gateway node, connecting the first and second multiplex transmission lines, for transferring data between the communication nodes of the first group and the communication nodes of the second group.

In accordance with this system, it is possible for the nodes belonging to each of the groups to form, for every group, a plurality of networks comprising nodes suitably allotted in accordance with the degree of contribution to control vehicle travel. By interposing the gateway node between the networks, a mutual transfer of data becomes possible without isolating any of the networks.

The system according to a preferred embodiment of the invention is characterized in that a connection can readily be made to an extra-vehicular network (e.g., a fault diagnosing system) by adopting the network arrangement that relies upon the intervention of the gateway node. In particular, a terminal or connector is provided for connecting the extra-vehicular network to the first and second networks.

In a system according to a preferred embodiment of the invention, communication nodes for the fault diagnosing system are connected to the extra-vehicular network.

According to a preferred embodiment of the invention, the communication nodes of the first group are communication nodes for various controllers used in controlling vehicle travel, these controllers requiring data having a high degree of interrelation.

According to a preferred embodiment of the invention, data frames which flow through the first and second networks have a common format, and a data frame includes designating information which, in accordance with the format, designates a communication node that is to receive the data frame.

According to a preferred embodiment of the invention, the gateway node stores affiliation information used in determining whether a communication node contained in the system belongs to the first group or the second group (or to the extra-vehicular network), and determines, based upon a comparison between the affiliation information and the received designating information, whether a data frame received from one network is to be transferred to the other network.

According to a preferred embodiment of the invention, a data frame which flows through a transmission line includes a field indicating the order of priority of the frame, a field containing information indicating a node generating the frame, and a field containing information indicating whether the generating node is in a malfunctioning state.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a table illustrating the correspondence between ID codes and network nodes;

DESCRIPTION OF THE PREFERRED EMBODIMENT

Reference will be had to the accompanying drawings to describe an embodiment in which the present invention is applied to a multiplex communication apparatus for an automobile employing the aforementioned PALMNET system.

Figure 1:
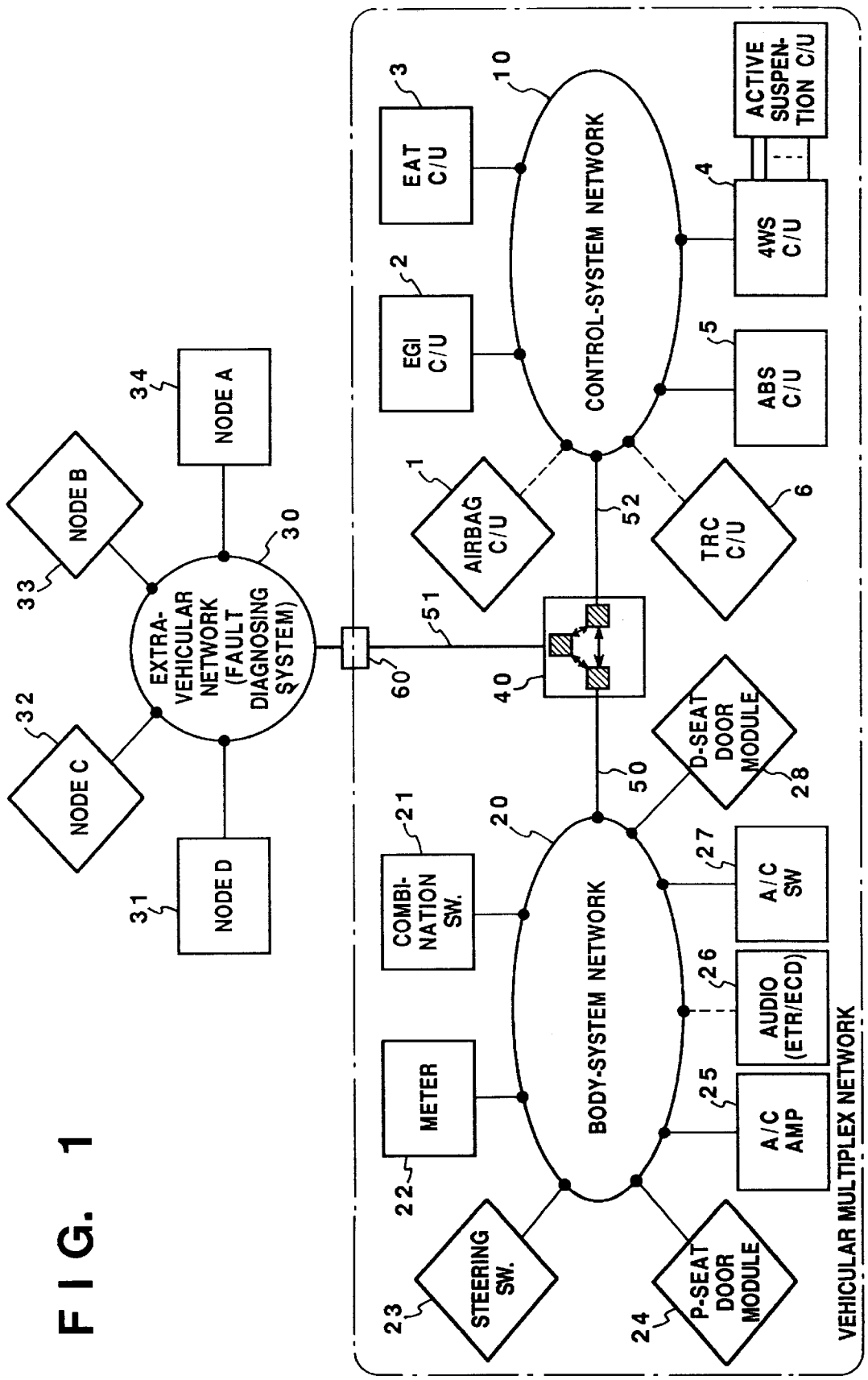
FIG. 1 is a diagram illustrating network construction of an embodiment to which the present invention is applied.

FIG. 1 illustrates the construction of the embodiment. As shown in FIG. 1, numerals 50, 51, and 52 denote transmission lines, each of which employs a twisted pair of wires. The communication speed is assumed to be 20 kbps. A plurality of nodes are connected to each of the transmission lines, each of which forms a network. Specifically, nodes 1 through 6 are connected to network 10, nodes 21 through 28 to network 20, and nodes 31 through 34 to network 30.

The networks 10, 20 are provided inside the vehicle. The network 30 is an extra-vehicular network which, in this embodiment, is a network system for fault diagnosis. The networks 10, 20, 30 are interconnected by a gateway node 40 via the transmission lines 52, 50, 51, respectively. The networks 10, 20 form an integrated network within the vehicle. The extra-vehicular network 30 is capable of being connected to the inside-vehicle networks 10, 20 by a connector 60 via the gateway node 40. This takes into consideration the fact that the connection may be made at a service station.

For the sake of convenience, the network 10, to which a large number of controllers are connected, shall be referred to as a "control-system network", and the network 20, to which various vehicle accessories such as switches and meters are connected, shall be referred to as a "body-system network".

The function of the gateway node will now be described. The presence of one data frame is permitted in one network. The presence of two frames on one network at any given time means that the frames will collide; error processing is executed as a result. One network is divided into two or more networks in pseudo-fashion. Within each individual divided network, frame data is exchanged freely independently of the other divided networks. By dividing the network into a plurality of networks, the presence of frame data in a number equivalent to that of the divided networks becomes possible, and therefore the network is used efficiently. However, there are cases where it is necessary to send data from one divided network to another divided network. Allowing the transfer of frame data to another divided network is the function of the gateway 40. That is, each network is connected by the gateway 40, and by virtue of a frame-exchange function possessed by the gateway 40, in which a frame-exchange is performed whenever necessary, frames are allowed to be transmitted simultaneously on each of the divided networks. This will be described later in greater detail in connection with functional addressing.

Figure 2:
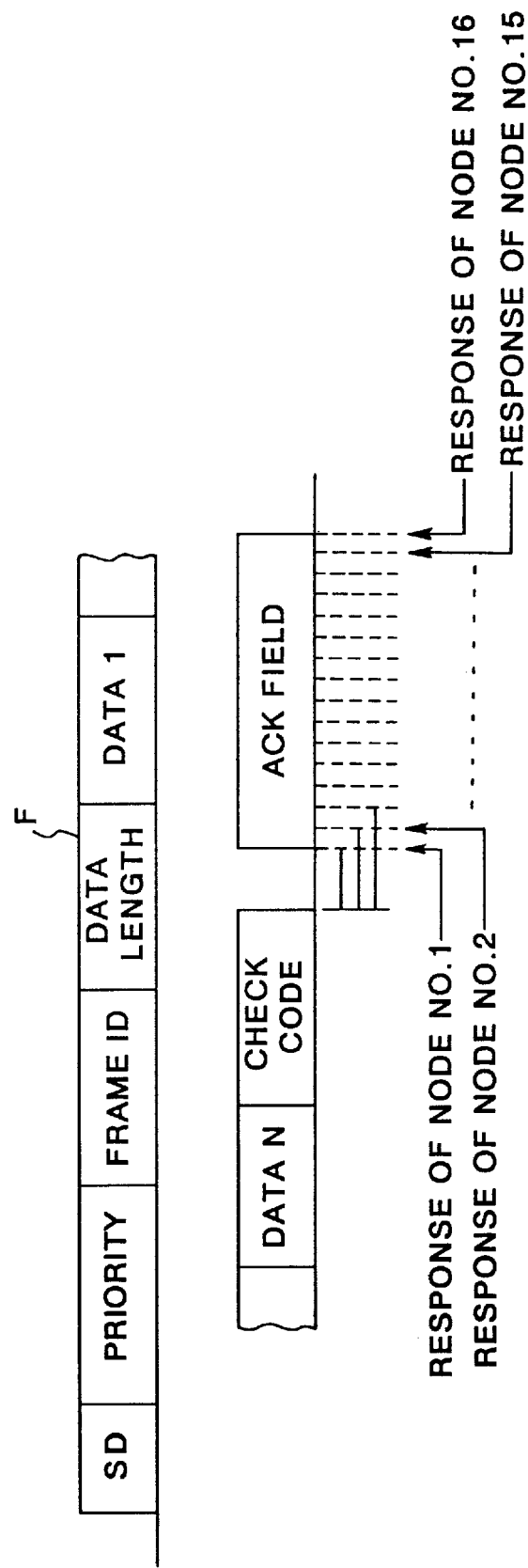
FIG. 2 is a diagram illustrating the format of a frame used in the embodiment.

In the multiplex transmission system for automobiles of the present embodiment, automobile operating information is transmitted every frame F, which has the configuration shown in FIG. 2.

The frame F has an SD (start delimiter) code, a priority code, a frame ID code, a data length, data 1 through N, and a check code.

The "SD" code is a specific code representing the start of the frame F. When a receiving multiplex node receives the SD code, it recognizes the start of the frame F. The "priority" code indicates order of priority, which designates which signal is to be given priority for processing when a plurality of multiplex nodes transmit data simultaneously so that the signals collide. In this embodiment, priority is such that the lower the bit value, the higher the order of priority. The reason is that the logic level is achieved by a wired-OR on bus 1. If signals are transmitted by a plurality of nodes at the same time, the "priority" codes of nodes having high orders of priority remain on bus 1. Therefore, nodes having low orders of priority detect collision since the priority codes transmitted by these nodes change to other codes. These nodes of low priority delay retransmission of their own failed frames, as a result of which retransmission from nodes of high priority takes precedence.

The "frame ID" code identifies the destination of the particular frame. The frame ID code corresponds to functional addressing as described in the paper "A Proposal for a Vehicle Network Protocol Standard" disclosed in the SAE International Congress and Exposition (February, 1986). This ID code is such that a node for the origin of a transmission is attached.

Figure 3:
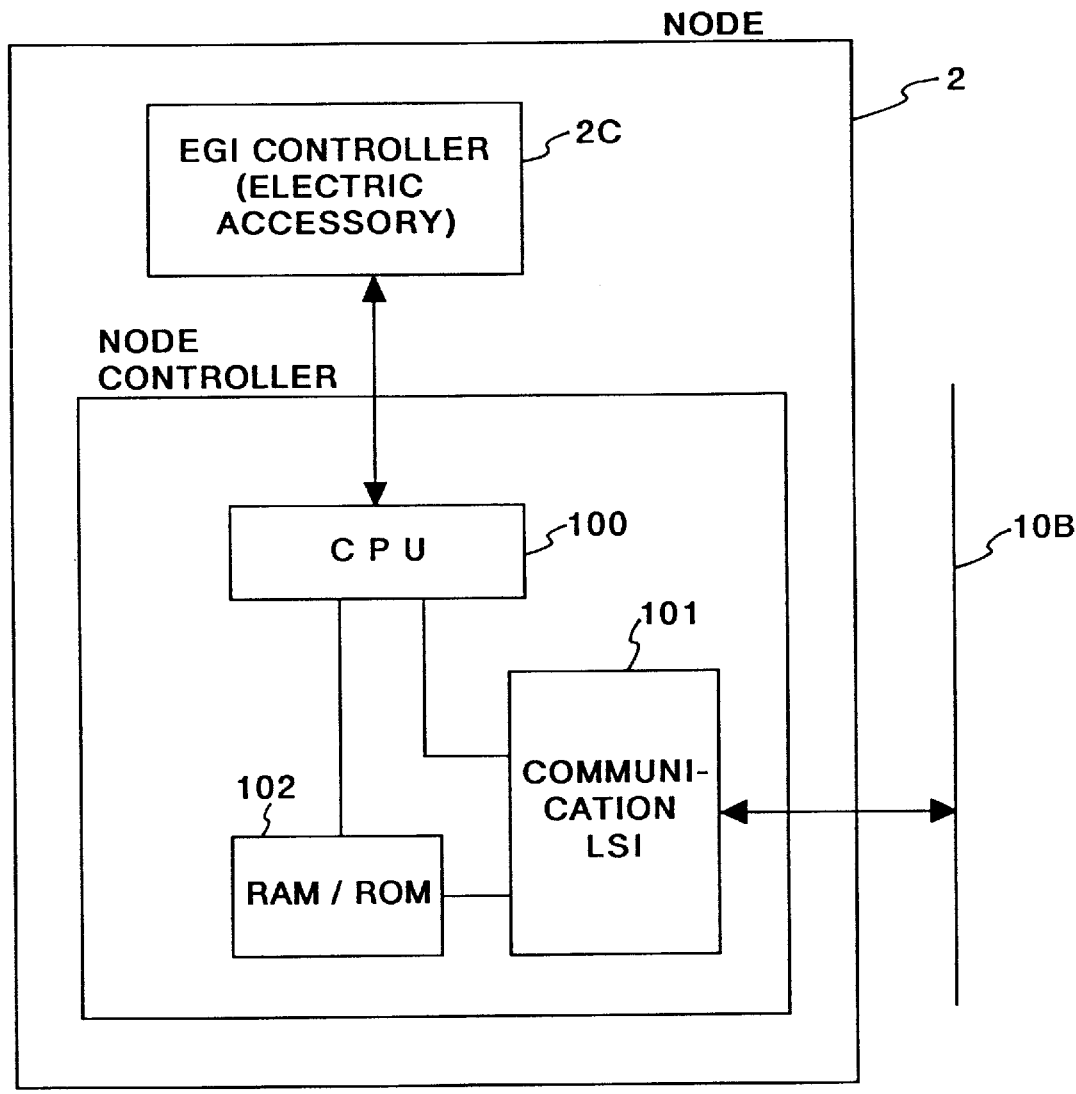
FIG. 3 is a block diagram illustrating the hardware construction of a node used in the embodiment.

As for "data length", a number of items of data are written following this. If these items of data are N in number, then N will be transmitted as the data length. At a multiplex node which has received this frame, only the content of this data length is read. The field which immediately follows this data is a CRC check code (error detection code). End of the frame can be determined by acknowledging this code. It should be noted that the format of FIG. 3 illustrates a general format; the data length of frames used in this embodiment is standardized at four bytes. If information for EGI, for example, also is contained in the same frame, then so is information for ABS, described later.

FIG. 3 is a diagram illustrating the construction of a communication node taking an EDG controller 2c for engine control as an example. As shown in FIG. 3, each node comprises an electrical accessory such as the EGI controller 2c, and a node controller. Each node of the control-system network 10 is connected to a transmission line 10B via a communication LSI 101. A CPU 100 is for controlling the LSI 101 and operates in accordance with programs stored in a RAM/ROM 102. Protocol control of the physical layer level of the CSMA/CD system is carried out by the LSI 101. The CPU 100 controls the LSI 101, executes the data from the LSI 101 and delivers the results of processing to the EGI controller 2c. Alternatively, the CPU 100 performs control for delivering data from the EGI controller 2c to the LSI 101. More specifically, for the sake of the controller devoted to engine control, the CPU 100 converts the frame data on the bus into a format capable of being used by the EGI controller 2c and converts data from the EGI controller 2c into the frame format.

The nodes of each network in FIG. 1 will now be described in simple terms.

The network 10 comprises a node 1 for an airbag control unit (denoted by C/U in FIG. 1), a node 2 for an EGI controller (EGI C/U) for the above-mentioned engine control, a node 3 for an automatic converter controller (EAT C/U), a node 4 for a rear-wheel drive controller (4WS/C/U), a node 5 for an anti-lock brake system (ABS/C/U); and a node 6 for a traction controller TRC·C/U. The 4wSC/U 4 is connected to an active suspension C/U. The various controllers connected to the network 10 must perform control operations that are closely interrelated. For example, information indicative of vehicle speed is indispensable for the EGI controller, EAT controller, 4WS controller and ABS controller, and information indicative of engine rotational speed and of the gear speed is also very important for these controllers. Thus, while cooperating with other controllers, the various controllers connected to the network 10 perform the control assigned to them.

The network 20 comprises a node 21 for a so-called combination switch which turns a headlight on and off, a node 22 for various meters such as a speedometer, a node 23 for a so-called steering switch provided in the proximity of the steering wheel, a node 24 for various switches provided in the door at a passenger's seat, a node 25 for the power amplifier of an air conditioner, a node 26 for various operating switches used for audio equipment (a tape recorder or CD player), a node 27 for an air conditioner switch, and a node 28 for various switches provided in the door of the driver's seat (D controller). Thus, the nodes connected to the network 20 are switches, sensors and actuators related to the vehicle body and are referred to generically as the "body-system nodes", as mentioned earlier.

The nodes (31 through 34) for devices (not shown) used in various types of fault diagnosis are connected to the network 30.

By thus collecting only the nodes of the control system in the network 10, the latter is capable of performing efficient "cooperative control". Further, by collecting only the body-system nodes in the network 20 and separating this network from the network 10, it is possible to prevent loss of control in the controller-system nodes from affecting the network 20.

The interconnection among the these three networks will be described by explaining the aforementioned functional addressing, namely the ID codes.

The data field of FIG. 2 has a length of four bytes, as mentioned above. The type of data stored at each bit position of this data field differs depending upon the ID code. That is, what information is signified by a bit in the data field is decided beforehand in dependence upon the ID code. In other words, if a node which has received a frame knows the ID code in the frame, then it is capable of knowing what the information of the bit in the data field represents. More specifically, the node is capable of determining whether the information is for the node itself or information not required for itself.

As mentioned above, single frames are capable of physically existing simultaneously on the respective transmission lines of the networks 10, 20 by virtue of the gateway 40. Accordingly, as long as the necessary frames are being exchanged only between nodes belonging to the same network, the networks 10 and 20 are each capable of performing frame transmission independently of each other in a highly efficient manner. In other words, highly efficient "cooperative control" is possible within the network 10. As a matter of course, however, the controllers cannot perform control without information from the sensors and switches, and control cannot be brought to a conclusion without actuators. Accordingly, it is necessary to perform an exchange of frame data via the gateway node 40 between the network 10 and the network 20. By observing the aforesaid ID codes, the gateway 40 determines, for example, whether frame data on the network 10 is necessary also for the nodes in the network 20 and, if the frame data is necessary for these nodes, transfers this frame data to the network 20.

FIG. 4 illustrates which nodes information is intended for, and which frames, identified by ID codes, contain this information. For example, it will be understood that if a certain node on the transmitting side transmits a frame whose ID code is 80, then this frame contains the data information required by the EGI node 2, the EAT node 3 and the combination node 21, as illustrated using circles in FIG. 4. Though the EGI node 2 and EAT node 3 are connected to the network 10, the combination node 21 is connected to the network 20. If a frame whose ID is 80 is transmitted to network 10 from one node of the controller system belonging to network 10, then this frame must be transferred also to the combination node 21 (on network 20) requiring the frame. Accordingly, based upon the ID code, the gateway node 40 determines whether a frame is one required by another network as well. If the frame is required, the gateway node 40 transfers this frame to the other network.

Figure 5A:
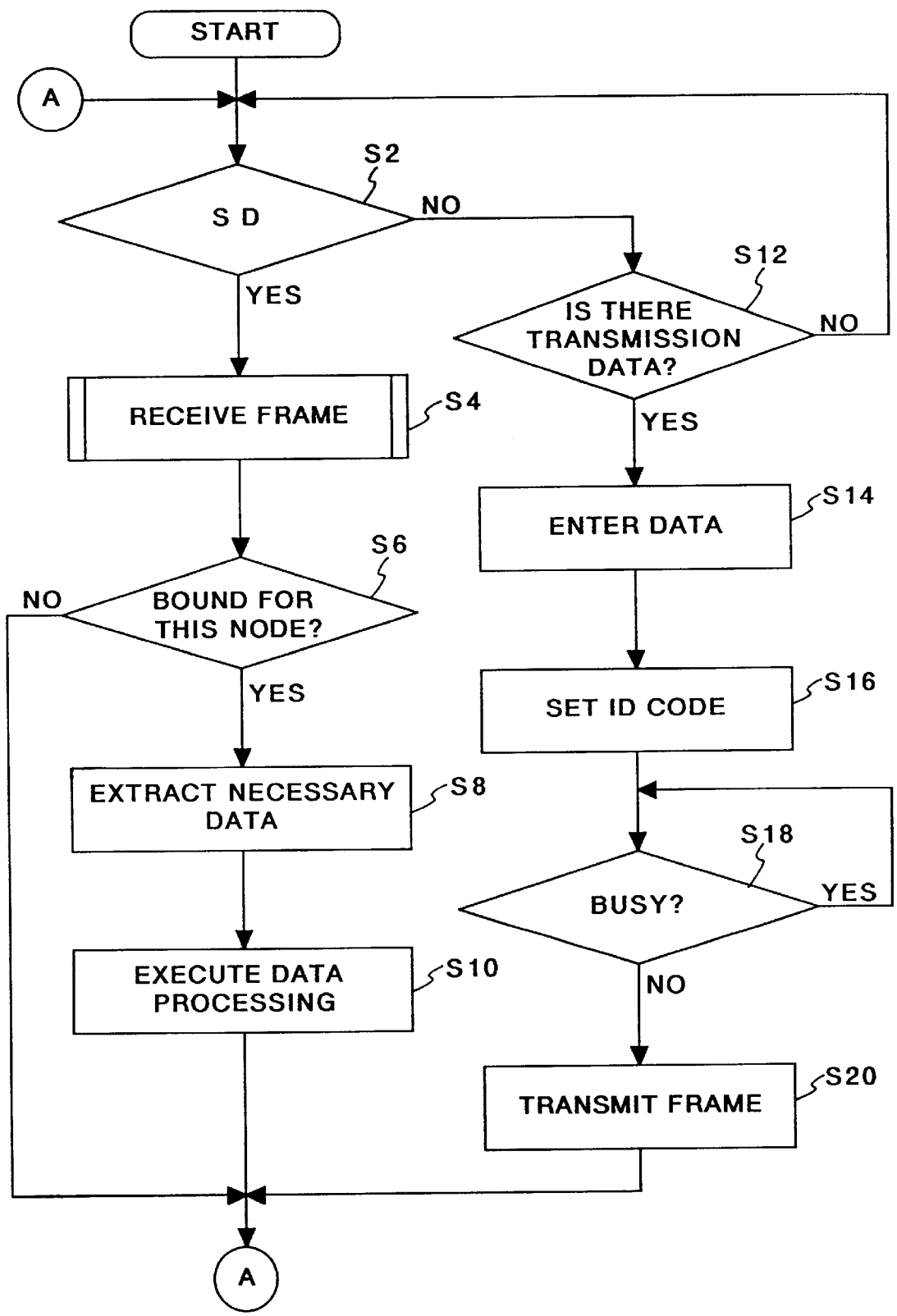
FIGS. 5A and 5B are flowcharts illustrating a control procedure for ordinary nodes and a control procedure for gateway nodes, respectively.
Figure 5B:
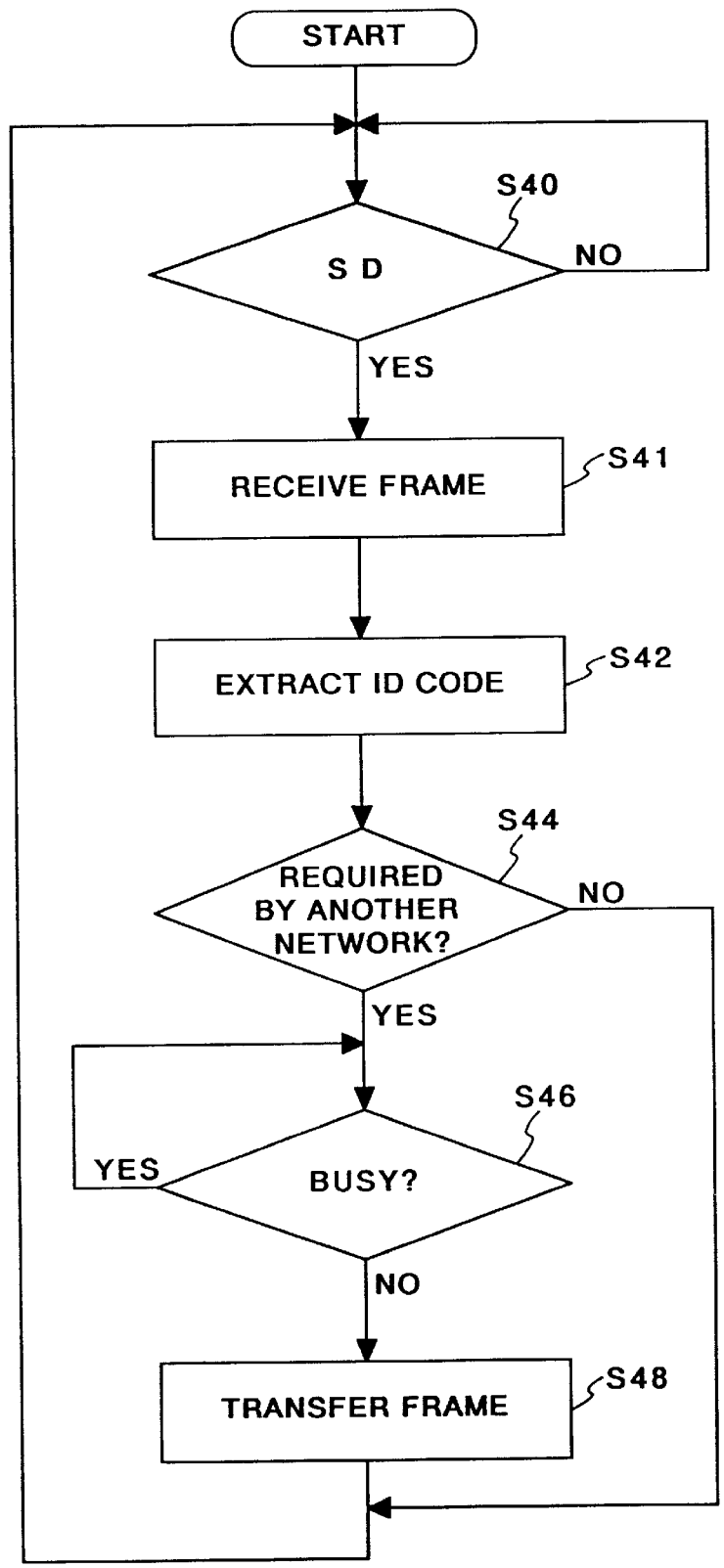

FIG. 5A illustrates, in simplified form, a control procedure for nodes other than the gateway node 40, and FIG. 5B illustrates a control procedure for the gateway node 40.

A transmission control procedure regarding ordinary nodes (nodes other than the gateway node 40) will now be described. It is determined at step S2 of the flowchart whether SD, which indicates the beginning of the frame, has been detected on a transmission line (50, 51 or 52). If SD has been detected, the frame is received at step S4. Next, based upon the ID code in the received frame, it is determined at step S6 whether the frame is one intended for the node itself. If the frame contains information indicating that the frame is for the node itself, then the necessary data is extracted at step S8 and the data is processed at step S10. More specifically, if the received node is a body-system node, e.g., the air conditioner amplifier node (AC AMP) 25, then this amplifier is driven into operation. If the node is a control-system node, then, say, information necessary for the EGI controller 2c, e.g., the necessary torque information, is delivered.

If there is no frame data on the transmission line, it is determined at step S12 whether there is data to be transmitted from the node proper. Whether or not the data is present is communicated to the CPU 100 (see FIG. 3) of this node by an interrupt from the sensor, switch or controller of the node. If there is data to be transmitted, the data is collected from the sensor, switch of controller at step S14, and then an ID code corresponding to the collected information is set at step S16. Frame data to be transmitted is thus created. After it is determined at step S18 that the transmission line is not busy, this frame is transmitted at step S20.

The control procedure of the gateway node 40 will now be described with reference to FIG. 5B. It is determined at step S40 of the flowchart whether SD, which indicates the beginning of the frame, has been detected on a transmission line (50, 51 or 52). If SD has been detected, the frame is received at step S41. Next, based upon the ID code in the received frame, it is determined at steps S42 and S44 whether the frame includes information required by another network. This determination is possible owing to the fact that the gateway node 40 possesses the table of the kind shown in FIG. 4. If it is determined that the node is one which includes information required by another network, then, after it is verified at step S46 that the transmission line is not busy, the frame is transmitted at step S48.

Thus, frame transfer is possible between networks 10 and 20, networks 20 and 30, and networks 10 and 30. This frame transfer is performed only when necessary, and therefore ordinary frame transmission within the individual networks (namely transmission which does not require a transfer to another network) is carried out very efficiently.

Figure 6:
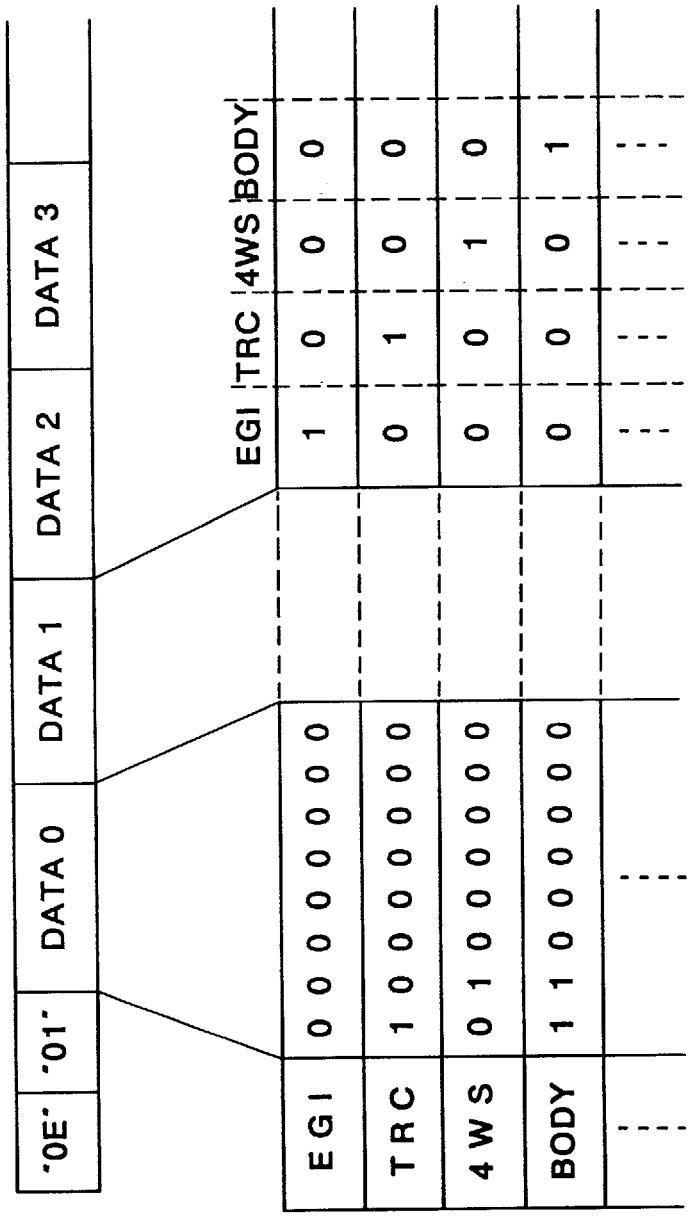
FIG. 6 is a diagram for describing the format of a failure alarm frame.

FIG. 6 illustrates the format of a frame (a failure alarm frame) exchanged between the networks 10, 20 and the network 30 in a case where the network 30, which includes the nodes of the fault diagnosing system, is connected to the networks 10, 20 by the connector 60.

The order of priority of the failure alarm frame is "OE". This is the highest order of priority. As a result, delivery of the failure alarm frame to the entire system is implemented with the highest priority. Further, the ID code is "01", by which the network 30 recognizes that the frame is the failure alarm frame. A DATA #0 field specifies the node which is transmitting the failure alarm frame. In this embodiment, a DATA #0 field of "00000000" indicates that the transmitting node is the EGI node, "10000000" indicates that the transmitting node is the TRC node, "01000000" indicates that the transmitting node is the 4WS node, and "11000000" indicates that the transmitting node is the body-system node.

A DATA #2 field specifies which node has failed. The first bit of the DATA #2 field indicates the status (failed or not) of the EGI node, the second bit indicates the status of the TRC node, third bit indicates the status of the 4WS node, and the fourth bit indicates the status of the body-system node. Specifically, if a bit is "1", this means that the corresponding node has failed; if a bit is "0", this means that the corresponding node has not failed.

Each node of the extra-vehicular network 30 also has a node controller (inclusive of the CPU 100 and LSI 101) identical with that shown in FIG. 3. This node controller is connected to a predetermined fault diagnosing apparatus and performs control illustrated by FIG. 5A. More specifically, when data having the format shown in FIG. 6 is received (step S4), a display lamp is lit at step S10 based upon this data, thereby giving an indication of failure.

Thus, fault diagnosis can be carried out in appropriate fashion.

Thus, in accordance with the foregoing embodiment, the present invention has the following advantages:

(a) The controller-system nodes, which often require cooperative control, are all connected to the same network 10. Therefore, since one frame is used simultaneously by a plurality of controller-system nodes, data transmission is highly efficient. In other words, highly efficient cooperative control is possible.

Since the body-system nodes of the network 20 are separated from the controller-system nodes of the network 10, incidents in which loss of control of the nodes in one network cause a malfunction in the nodes of another network are reduced.

(b) Information required over different networks is transferred to other nodes by the gateway node 40 only when necessary. As a result, the transfer is efficient. In making the transfer, the necessity of the transfer can be determined merely by referring to the ID code.

(c) By providing the gateway and the detachable connector, the fault diagnosing system, which is not required during normal operation, can be connected to the vehicular networks (10, 20) only when necessary. Whereas the fault diagnosing system is connected by a parallel bus in the prior art, the system is connected by a serial bus in this embodiment. This greatly facilitates the attaching and detaching of the system as well as reliability.

The present invention can be modified in various ways without departing from the scope of the claims.

For example, the number of nodes is not limited to the number set forth above.

Further, though the gateway node 40 dedicated solely to frame exchange is used as a gateway in the foregoing embodiment, the nodes of either network 10 or 20 can be made to perform the frame exchange function in addition to their other functions.

In the embodiment described above, three networks exist, and each network forms a single network in conformity with the assigned role (communication among the controllers for cooperative control, communication among the body-system electrical accessories, and fault diagnosis). However, network organization from other viewpoints also is possible. For example, if a network is divided into two separate networks, the nodes to be connected to each network can be divided into groups in such a manner that the generation frequency of frame data which flows through the network is equalized between the two networks. In actuality, high-speed and low-speed nodes mix. If such an arrangement is adopted, it is possible to eliminate inefficient operation in which the data traffic of a specific network becomes very heavy while the data traffic on another network becomes very light.

The present invention is not limited to the above embodiments and various changes and modifications can be made within the spirit and scope of the present invention. Therefore, to apprise the public of the scope of the present invention, the following claims are made.

What is claimed is:

1. A multiplex transmission system for a vehicle having a first plurality of communication nodes belonging to a first group and a second plurality of communication nodes belonging to a second group, said first plurality of communication nodes and said second plurality of communication nodes communicating information relating to electrical accessories of the vehicle in accordance with a multiplex communication protocol, comprising:

a first network having a first multiplex transmission line to which the first plurality of communication nodes of said first group are commonly connected, the first plurality of communication nodes exchanging a data frame with each other via the first multiplex transmission line;

a second network having a second multiplex transmission line to which the second plurality of communication nodes of said second group are commonly connected, the second plurality of communication nodes exchanging a data frame with each other via the second multiplex transmission line; and a gateway node, connecting said first and second multiplex transmission lines, to transfer data frames between the first plurality of communication nodes of said first group and the second plurality of communication nodes of said second group, wherein the nodes connected to the first network and the nodes connected to the second network transfer data frames having different information data independently of each other, and transfer data frames having information required by both the first and second networks simultaneously on each of the first and second networks, and the data frames which are exchanged by the first plurality of communication nodes, the data frames which are exchanged by the second plurality of communication nodes, and the data frames which are transferred between the first plurality of communication nodes of the first group and the second plurality of communication nodes of the second group by the gateway node have a common format including an identification code which identifies at least two communication nodes that are to receive a data frame, and wherein the gateway node determines whether a data frame on one network is necessary to be transferred to the other network on the basis of the identification code;

wherein an electrical accessory of a communication node of the first group is operatively related with an electrical accessory of another communication node of the first group to an extent which is larger than an extent to which an electrical accessory of a communication node of the second group is operatively related with an electrical accessory of another communication node of the second group, and wherein the first plurality of communication nodes of said first group share information data within the first group to an extent which is larger than an extent to which the second plurality of communication nodes of the second group share information data within the second group.

2. The system according to claim 1, wherein said gateway node has one of a terminal and a connector connecting an optional extra-vehicular network to said first and second networks.

3. The system according to claim 2, wherein communication nodes for a fault diagnosing apparatus are connected to said extra-vehicular network.

4. The system according to claim 1, wherein each of the data frames includes data and designating information which, in accordance with the common format, designates a communication node that is to receive each of the data frames and priority information indicating a priority for processing the data when the data frames are received simultaneously in each of said first and second networks.

5. The system according to claim 3, wherein each of the data frames includes data and designating information which, in accordance with the common format, designates a communication node that is to receive each of the data frames and priority information indicating a priority for processing the data when the data frames are received simultaneously in each of said first and second networks.

6. The system according to claim 4, wherein said gateway node stores affiliation information used in determining whether the communication node contained in the multiplex transmission system belongs to one of said first group and said second group, and determines, based upon a comparison between the affiliation information and the designating information, whether each of the data frames received from one of said first and second networks is to be transferred to another of said first and second networks.

7. The system according to claim 4, wherein said gateway node stores affiliation information used in determining whether the communication node contained in the multiplex transmission system belongs to one of said first group, said second group and an extra-vehicular network, and determines, based upon a comparison between the affiliation information and the designating information, whether the data frames received from one of said first and second networks are to be transferred to another of said first and second networks.

8. The system according to claim 1, wherein a first communication node included in said first group controls communication for one of a fuel injection-rate controller, an automatic transmission controller, a traction controller and a rear-wheel steering controller.

9. The system according to claim 1, wherein a second communication node included in said second group controls communication for one of a switch and meter.

10. The system according to claim 7, wherein each of the data frames includes:

a first field indicating an order of priority of the data frames;

a second field which includes first information indicating a node generating the data frames; and a third field which includes second information indicating a fault status of the node generating the data frames.

11. The system according to claim 10, wherein when a data frame designates a fault status of the node generating the data frame, the first field indicating the order of priority has a value which is a highest order of priority.

12. The system according to claim 1, wherein the multiplex transmission system is a CSMA/CD-type communication system.

13. A method of organizing networks in a multiplex transmission system for a vehicle, in which the networks have a plurality of communication nodes for communicating information relating to electrical accessories of the vehicle in accordance with a multiplex communication protocol, and in which a data frame flows between the plurality of communication nodes and contains an address field capable of specifying at least two communication nodes, the method comprising the steps of:

(a) grouping and connecting a first plurality of communication nodes belonging to a first group to a first transmission line to form a first network, wherein the first plurality of communication nodes are closely related with each other and the data frames are exchanged between said first plurality of communication nodes;

(b) grouping and connecting a second plurality of communication nodes other than said first plurality of communication nodes to a second transmission line to form a second network, the second transmission line being isolated from the first transmission line;

(c) interconnecting said first and second transmission lines via a gateway node;

(d) transmitting a first frame containing first information data on the first network;

(e) determining whether a node of the second network requires the first information data contained in the first frame;

(f) transmitting a second frame, containing information different from the first frame, on the second network independently of transmission of the first frame on the first network when it is determined that the node of the second network does not require the first information data contained in the first frame; and (g) transmitting the first frame simultaneously on the first network and on the second network when a determination is made that the node of the second network requires the first information data, wherein said first group nodes and second group nodes are grouped in such manner that an electrical accessory of a communication node of the first group is operatively related with an electrical accessory of another communication node of the first group to an extent which is larger than an extent to which an electrical accessory of a communication node of the second group is operatively related with an electrical accessory of another communication node of the second group, and that the first plurality of communication nodes of said first group share information data therewithin to an extent which is larger than an extent to which the second plurality of communication nodes of the second group share information data therewithin.

14. A multiplex transmission system for a vehicle having a first plurality of communication nodes belonging to a first group and a second plurality of communication nodes belonging to a second group, said first plurality of communication nodes and second plurality of communication nodes communicating information relating to electrical accessories of the vehicle in accordance with a multiplex communication protocol, comprising:

a first network having a first multiplex transmission line to which the first plurality of communication nodes of said first group are commonly connected so that the first plurality of communication nodes are concerned with controlling the vehicle to travel and exchange a data frame with each other via the first multiplex transmission line; and a second network having a second multiplex transmission line to which the second plurality of communication nodes of said second group are commonly connected so that the second plurality of communication nodes are nodes other than the first plurality of nodes, and the second plurality of communication nodes exchange a data frame with each other via the second multiplex transmission line;

a gateway node, connecting said first and second multiplex transmission lines, to transfer data frames between the first plurality of communication nodes of said first group and the second plurality of communication nodes of said second group;

wherein the data frames which are exchanged by the first plurality of communication nodes and the data frames which are exchanged by the second plurality of communication nodes, and the data frames which are transferred between the first plurality of communication nodes of the first group and the second plurality of communication nodes of the second group by the gateway node, have a common format including an identification code which identifies communication nodes which are to receive a data frame, and wherein the gateway node determines whether a data frame on one network is necessary to be transferred to the other network on the basis of the identification code;

wherein an electrical accessory of a communication node of the first group is operatively related with an electrical accessory of another communication node of the first group to an extent which is larger than an extent to which an electrical accessory of a communication node of the second group is operatively related with an electrical accessory of another communication node of the second group, and wherein the first plurality of communication nodes of said first group share information data within the first group to an extent which is larger than an extent to which the second plurality of communication nodes of the second group share information data within the second group.

15. A method of organizing networks in a multiplex transmission system for a vehicle, in which the networks have a plurality of communication nodes for communicating information relating to electrical accessories of the vehicle in accordance with a multiplex communication protocol, and in which a data frame flows between the plurality of communication nodes and contains an address field capable of specifying at least two communication nodes, the method comprising the steps of:

(a) grouping and connecting a first plurality of communication nodes belonging to a first group to a first transmission line to form a first network, wherein the first plurality of communication nodes are concerned with controlling the vehicle to travel and the data frames are exchanged between said first plurality of communication nodes;

(b) grouping and connecting a second plurality of communication nodes other than the first plurality of communication nodes to a second transmission line to form a second network, the second transmission line being isolated from the first transmission line;

(c) interconnecting said first and second transmission lines via a gateway node;

(d) transmitting a first frame containing first information data on the first network;

(e) determining whether a node of the second network requires the first information data contained in the first frame;

(f) transmitting a second frame, containing information different from the first frame, on the second network independently of transmission of first frame on the first network when it is determined that the node of the second network does not require the first information data contained in the first frame; and (g) transmitting the first frame simultaneously on the first network and on the second network when a determination is made that the node of the second network requires the first information data, wherein said first group nodes and second group nodes are grouped in such manner that an electrical accessory of a communication node of the first group is operatively related with an electrical accessory of another communication node of the first group to an extent which is larger than an extent to which an electrical accessory of a communication node of the second group is operatively related with an electrical accessory of another communication node of the second group, and that the first plurality of communication nodes of said first group share information data therewithin to an extent to which is larger than an extent to which the second plurality of communication nodes of the second group share information data therewithin.

16. A method of organizing a plurality of communications nodes, which share information to varying extents, into networks in a multiplex transmission system for a vehicle, comprising the steps of:

dividing the plurality of nodes into a first group of nodes and a second group of nodes, the respective nodes which comprise the first group of nodes and the second group of nodes being selected according to an extent to which the group of nodes share information;

connecting the first group of nodes to a transmission line to form a first network and connecting the second group of nodes to a second transmission line to form a second network;

connecting the respective transmission lines via a gateway node;

transmitting a first frame containing first information data on the first network;

determining whether a node of the second network requires the first information data contained in the first frame;

transmitting a second frame, containing information different from the first frame, on the second network independently of transmission of the first frame on the first network when it is determined that the node of the second network does not require the first information data contained in the first frame; and transmitting the first frame simultaneously on the first network and on the second network when a determination is made that the node of the second network requires the first information data.

17. A multiplex transmission system for a vehicle having a plurality of communications nodes for communication information related to electrical accessories of the vehicle which perform vehicle functions, comprising:

a first network including a first plurality of communications nodes connected to a first multiplex transmission line, the first plurality of communications nodes sharing information required to perform vehicular functions to a large extent;

a second network including a second plurality of communications nodes connected to a second multiplex transmission line, the second plurality of communications nodes sharing information required to perform vehicular functions to an extent which is less than an extent to which the first plurality of communications nodes share information;

a gateway node connecting the first network and the second network, the gateway node including determining means for determining whether information required by a communication node connected to the first network is required at the same time by a communication node connected to the second network, and whether information required by a communication node connected to the second network is required at the same time by a communication node connected to the first network, wherein the first and second plurality of communications nodes transfer data frames having a common format, and the first network communicates a first data frame containing first information related to an electrical accessory performing a first vehicle function on the first network independently of the second network communicating a second data frame containing second information related to an electrical accessory performing a second vehicle function when the determining means determines that information required on one network is not required on the other network, and wherein a common data frame is transmitted simultaneously on both the first and second networks when the determining means determines that information required by one network is required at the same time by the other network.

18. The system as recited in claim 17, wherein each of the data frames includes data and designating information which designates a communication code that is to receive each of the data frames and priority information indicating a priority for processing the data when the data frames are received simultaneously in each of the first and second networks.

19. The system as recited in claim 18, wherein the determining means stores affiliation information used in determining whether a communication node in the multiplex transmission system belongs to the first network or the second network, and determines whether each of the data frames received from one of the first and second networks is to be transferred to another of the first and second networks based upon a comparison between the affiliation information and the designating information.

* * * * *

UNITED STATES PATENT AND TRADEMARK OFFICE
CERTIFICATE OF CORRECTION

PATENT NO.:    5,856,976
DATED     :    January 5, 1999
INVENTOR(S):   Seiji Hirano It is certified that error appears in the above-identified patent and that said Letters Patent is hereby corrected as shown below:

Column 5,  line 44, change "(4WS/C/U)" to --(4WS C/U)--;
           line 45, change "(ABS/C/U)" to --(ABS C/U)--;
           line 46, change "4wSC/U" to --4WS C/U--.

Signed and Sealed this

Tenth Day of August, 1999

Attest:

Attesting Officer

Q. TODD DICKINSON

Acting Commissioner of Patents and Trademarks